US009829907B2

United States Patent
Kim et al.

(10) Patent No.: US 9,829,907 B2
(45) Date of Patent: Nov. 28, 2017

(54) APPARATUS FOR REDUCING PEDAL EFFORT FOR VEHICLE

(71) Applicants: Hyundai Motor Company, Seoul (KR); Kyung Chang Industrial Co.,Ltd., Daegu (KR)

(72) Inventors: Eun Sik Kim, Gwangmyeong-si (KR); Jong Hee Han, Waegwan-eup (KR)

(73) Assignees: Hyundai Motor Company, Seoul (CN); Kyung Chang Industrial Co., Ltd., Daegu (KR)

( * ) Notice: Subject to any disclaimer, the term of this patent is extended or adjusted under 35 U.S.C. 154(b) by 133 days.

(21) Appl. No.: 14/829,343

(22) Filed: Aug. 18, 2015

(65) Prior Publication Data

US 2016/0187915 A1 Jun. 30, 2016

(30) Foreign Application Priority Data

Dec. 30, 2014 (KR) .......................... 10-2014-0193014

(51) Int. Cl.
*G05G 1/44* (2008.04)
*G05G 1/327* (2008.04)
(Continued)

(52) U.S. Cl.
CPC .............. *G05G 1/44* (2013.01); *B60K 23/02* (2013.01); *G05G 1/327* (2013.01); *G05G 5/03* (2013.01);
(Continued)

(58) Field of Classification Search
CPC .......... G05G 1/445; G05G 1/46; G05G 1/327; G05G 1/44; G05G 1/40; G05G 1/38;
(Continued)

(56) References Cited

U.S. PATENT DOCUMENTS 4,385,754 A * 5/1983 Waite ..................... G05G 5/05
267/71
4,522,082 A 6/1985 Musumiya et al.
(Continued)

FOREIGN PATENT DOCUMENTS

| DE | 10258938 A1 * | 7/2004 | ............. F16D 23/12 |
| DE | EP 1596268 A2 * | 11/2005 | ................ F16F 1/12 |
| KR | 20-0239833 Y1 | 12/2001 | |
| KR | 10-0820241 B1 | 4/2008 | |
| KR | 10-0825937 B1 | 4/2008 | |
| KR | 10-1034110 B1 | 5/2011 | |

(Continued)

OTHER PUBLICATIONS

EPO Translation of the Description of EP 1596268 A2, Bojarra et al., Nov. 16, 2005.*

*Primary Examiner* — Daniel D Yabut
(74) *Attorney, Agent, or Firm* — Morgan, Lewis & Bockius LLP

(57) ABSTRACT

An apparatus for reducing a pedal effort for a vehicle may include a housing having a first end that is opened and a second end that is rotatably coupled to a pedal member, an elastic body inserted into the housing, a slider contacting the elastic body and configured to be slid along a length of the housing, cover plates coupled to the slider and contacting an outer peripheral surface of the housing so as to guide movement of the slider, and a lever protrusion rotatably coupled to the pedal member, having an end portion rotatably coupled to the slider, and configured to rotate together with a pedal depending on rotation of the pedal, to slide the slider.

13 Claims, 15 Drawing Sheets

(51) Int. Cl.
　　　*G05G 5/05*　　　　(2006.01)
　　　*B60K 23/02*　　　(2006.01)
　　　*G05G 5/03*　　　　(2008.04)
(52) U.S. Cl.
　　　CPC ............ *G05G 5/05* (2013.01); *Y02T 10/6204*
　　　　　　　　　(2013.01); *Y02T 10/6282* (2013.01)
(58) Field of Classification Search
　　　CPC ... G05G 1/30; G05G 5/03; G05G 5/05; B60K
　　　　　　　23/02; F16F 3/04; F16F 1/1218; F16F
　　　　　　　1/125; F16F 1/123; F16F 1/122; F16F
　　　　　　　1/12; F16D 23/12; Y10T 74/20528; Y10T
　　　　　　　74/20534; Y10T 74/2054; Y10T 74/20888
　　　See application file for complete search history.

(56) References Cited

U.S. PATENT DOCUMENTS

| | | | |
|---|---|---|---|
| 6,584,634 B2 | 7/2003 | Stiefenhofer | |
| 2009/0000418 A1* | 1/2009 | Kim .................. | B60K 23/02 |
| | | | 74/512 |
| 2010/0140008 A1* | 6/2010 | Kim .................. | B60R 21/09 |
| | | | 180/271 |

FOREIGN PATENT DOCUMENTS

| | | |
|---|---|---|
| KR | 10-1305862 B1 | 9/2013 |
| KR | 10-1491379 B1 | 2/2015 |
| KR | 10-1509997 B1 | 4/2015 |
| WO | WO 2005/075237 A1 | 8/2005 |

\* cited by examiner

APPARATUS FOR REDUCING PEDAL EFFORT FOR VEHICLE

CROSS REFERENCE TO RELATED APPLICATION

The present application claims priority to Korean Patent Application No. 10-2014-0193014, filed Dec. 30, 2014, the entire contents of which is incorporated herein for all purposes by this reference.

BACKGROUND OF THE INVENTION

Field of the Invention

The present invention relates to an apparatus for reducing a pedal effort for a vehicle, and more particularly, to an apparatus for reducing a pedal effort for a vehicle capable of reducing an effort felt by a driver at the time of manipulating a pedal and being used even in a high horsepower vehicle having a high engine output.

Description of Related Art

Generally, a manual transmission vehicle is provided with a clutch installed between a flywheel and an input shaft of a transmission and intermitting power of an engine transferred to the transmission as needed, wherein the clutch has a structure in which it is manipulated by a clutch pedal.

The clutch pedal is frequently manipulated, together with an accelerator pedal and a brake pedal, by a driver at the time of driving the vehicle. Particularly, at the time of long distance driving, an effort depending on an operation of the clutch pedal is continuously transferred to the driver to increase fatigue of the driver.

In order to solve this problem, a clutch pedal apparatus to which a turnover spring is applied has been developed. As shown in FIG. 1 and FIG. 2, the turnover spring 1 includes two coil parts 1a wound in a coil shape and has spring bushes 2 coupled to both ends thereof, the spring bushes 2 are coupled to both side portions of a pedal member 3, respectively, while penetrating through both side portions of the pedal member 3, respectively, an intermediate portion between the two coil parts 1a is fitted into and coupled to a catching groove 4a of a spring bracket 4, and the turnover spring 1 is installed so as to be rotatable with respect to the pedal member 3.

Here, the spring bracket 4 is coupled integrally with a hinge shaft bush 5, and the hinge shaft bush 5 is coupled integrally with a pedal 6 while penetrating through an upper end of the pedal 6, and a hinge shaft 7 penetrates through the hinge shaft bush 5 and is then fastened to the pedal member 3.

Therefore, when the pedal 6 hinges around the hinge shaft 7 (from a dotted line to a solid line) as shown in FIG. 3 by a manipulation by a driver's foot, the turnover spring 1 is compressed, and compression force is transferred to the pedal 6, such that reaction force is generated in the pedal 6 in an opposite direction to a direction of a load applied to the pedal 6. As a result, a load, that is, an effort, applied to the pedal 6 by the driver is gradually increased. In this case, the driver recognizes the reaction force transferred from the pedal 6, thereby figuring out an operation state of the pedal 6.

In addition, as soon as the turnover spring 1 is turned over from the dotted line shown in FIG. 3 to the solid line shown in FIG. 3 due to continuous rotation of the pedal 6, the reaction force of the turnover spring 1 is rapidly reduced, and the effort of the driver applied to the pedal 6 is also reduced. Therefore, fatigue of the driver is reduced at the time of operating the pedal 6 due to the reduced effort.

However, a structure of reducing the effort of the clutch pedal using the turnover spring 1 as described above has a disadvantage that component damage is often generated when the structure is used in a high horsepower vehicle having a high engine output.

That is, when a clutch disk and a flywheel are in a state in which they are connected to each other so that power of an engine may be transferred, sliding between the clutch disk and the flywheel should not be generated in order to smoothly transfer the power of the engine.

Therefore, in the case of the high horsepower vehicle having the high engine output, spring force of a diaphragm should be increased as compared with existing spring force in order to prevent the generation of the sliding between the clutch disk and the flywheel. To this end, in the structure according to the related art in which the turnover spring 1 is used, a method of increasing the spring force of the diaphragm by increasing a diameter of the turnover spring 1 has been used.

However, when the diameter of the turnover spring 1 is increased, a load is concentrated on the spring bush 2 connecting the turnover spring 1 and the pedal member 3 to each other, such that the spring bush 2 is often damaged. In addition, the diameter of the turnover spring 1 is increased, such that an initial effort is also increased, thereby increasing fatigue of the driver.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for reducing a pedal effort for a vehicle capable of reducing an effort felt by a driver at the time of manipulating a clutch pedal and being used particularly even in a high horsepower vehicle having a high engine output without damaging or injuring a component.

According to various aspects of the present invention, an apparatus for reducing a pedal effort for a vehicle may include a housing having a first end that is opened and a second end that is rotatably coupled to a pedal member, an elastic body inserted into the housing, a slider contacting the elastic body and configured to be slid along a length of the housing, cover plates coupled to the slider and contacting an outer peripheral surface of the housing so as to guide movement of the slider, and a lever protrusion rotatably coupled to the pedal member, having an end portion rotatably coupled to the slider, and configured to rotate together with a pedal depending on rotation of the pedal, to slide the slider.

The housing may be provided with a pair of cut openings cut from the first end thereof that is opened toward the second end thereof and facing each other.

The slider may contact the elastic body at an inner side of the housing, may have both end portions penetrating through the cut openings, and may have a pair of cover plates coupled to both end portions thereof, respectively.

Clearances may be formed between end portions of the pair of cover plates corresponding to each other, and may be formed so as to correspond to a coupled position between the housing and the pedal member.

A plurality of long grooves may be formed along the length of the housing on the outer peripheral surface of the housing and may be formed at predetermined intervals in a circumferential direction, and fitting protrusions inserted into the long grooves to guide the movement of the slider may be formed at the cover plates.

A plurality of fitting protrusions may be provided and formed at end portions of the cover plates, respectively, and the plurality of long grooves may be formed so as to correspond to the fitting protrusions, respectively.

The cover plates may be formed so as to be matched to a shape of an outer circumference of the housing and may be formed so as to have a predetermined width in a length direction of the housing in order to surface-contact the outer peripheral surface of the housing.

The housing may be formed in a cylindrical shape, and the cover plate may be bent so as to form an arc along a shape of an outer circumference of the housing.

The apparatus for reducing the pedal effort for the vehicle may further include a fastening bolt coupling the pedal member and the housing to each other while penetrating through the pedal member and the housing, having a screw thread formed at a first end portion thereof fastened to the pedal member so as to be screw-coupled to the pedal member, and having a plane pattern formed at a second end portion thereof coupled to the housing so as to be freely rotatably coupled to the housing.

The housing may include support protrusions formed at one end portion thereof, the support protrusions protruding outwardly from the housing so as to have a predetermined length, having a hollow part formed therein so that the second end portion of the fastening bolt may be inserted thereinto.

The apparatus for reducing the pedal effort for the vehicle may further include a fixing bracket coupling the pedal member and a vehicle body to each other, in which the fixing bracket may be provided with a separation groove opened toward a rear of the vehicle, and the pedal member may be coupled to the separation groove.

An uppermost end of the housing may be positioned at a position higher than that of a lowermost end of the fixing bracket in an initial position state of the pedal, and when impact is generated in the vehicle, such that the pedal member moves toward the rear of the vehicle, the pedal member may be separated from the fixing bracket along the separation groove, and the fixing bracket may collide with the housing to rotate the housing.

The pedal may be hinge-coupled to the pedal member so as to rotate in front and rear directions of the vehicle, and the housing may be configured to apply elastic force to the lever protrusion so that the pedal rotates toward the front of the vehicle in the initial position state of the pedal at a time of the rotation depending on the collision with the fixing bracket.

In a case in which the pedal is compressed and rotated in an initial position state of the pedal, such that a coupling center between the slider and the lever protrusion passes through a switching virtual line connecting a center of rotation of the housing and a center of rotation of the lever protrusion to each other, the elastic body may be compressed and may be then restored at a point in time in which the coupling center passes through the switching virtual line, thereby applying auxiliary force to the rotation of the lever protrusion.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
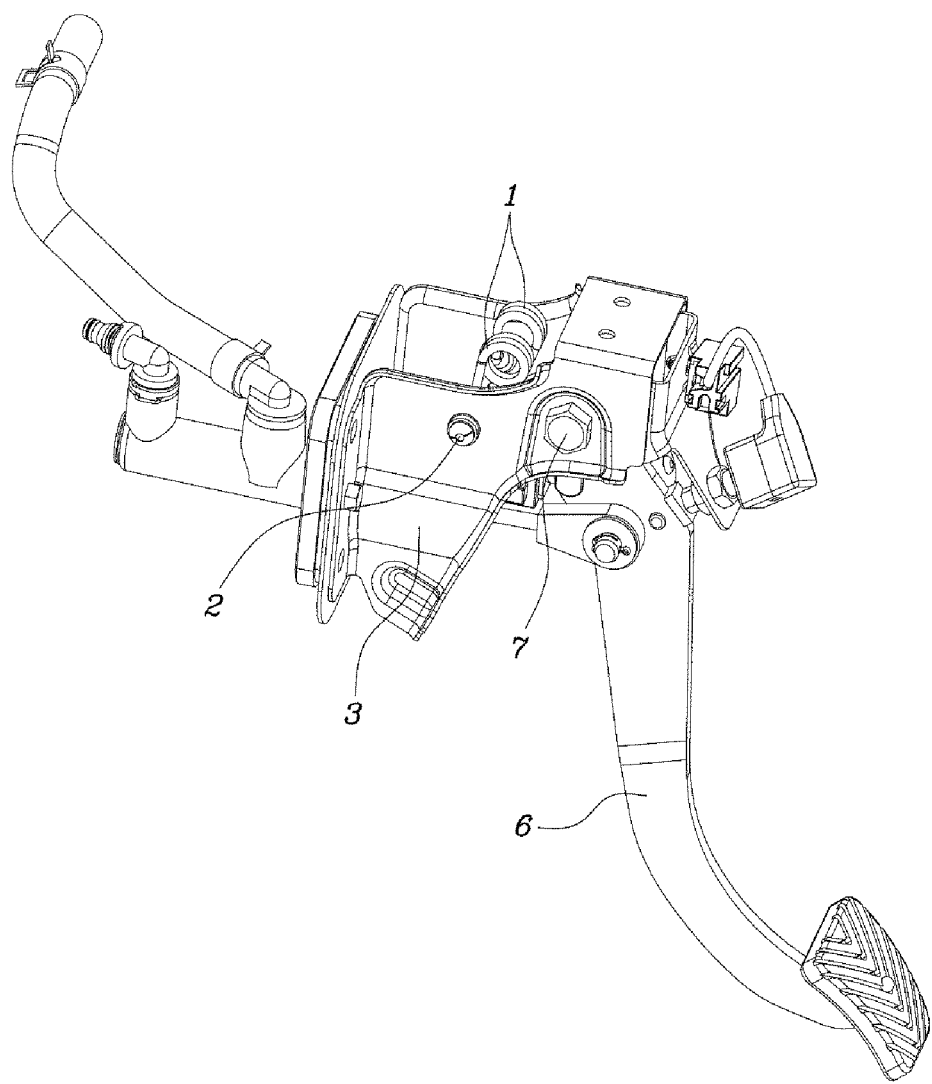
FIG. 1, FIG. 2, and FIG. 3 are views for describing a clutch pedal apparatus according to the related art including a turnover spring.
Figure 2:
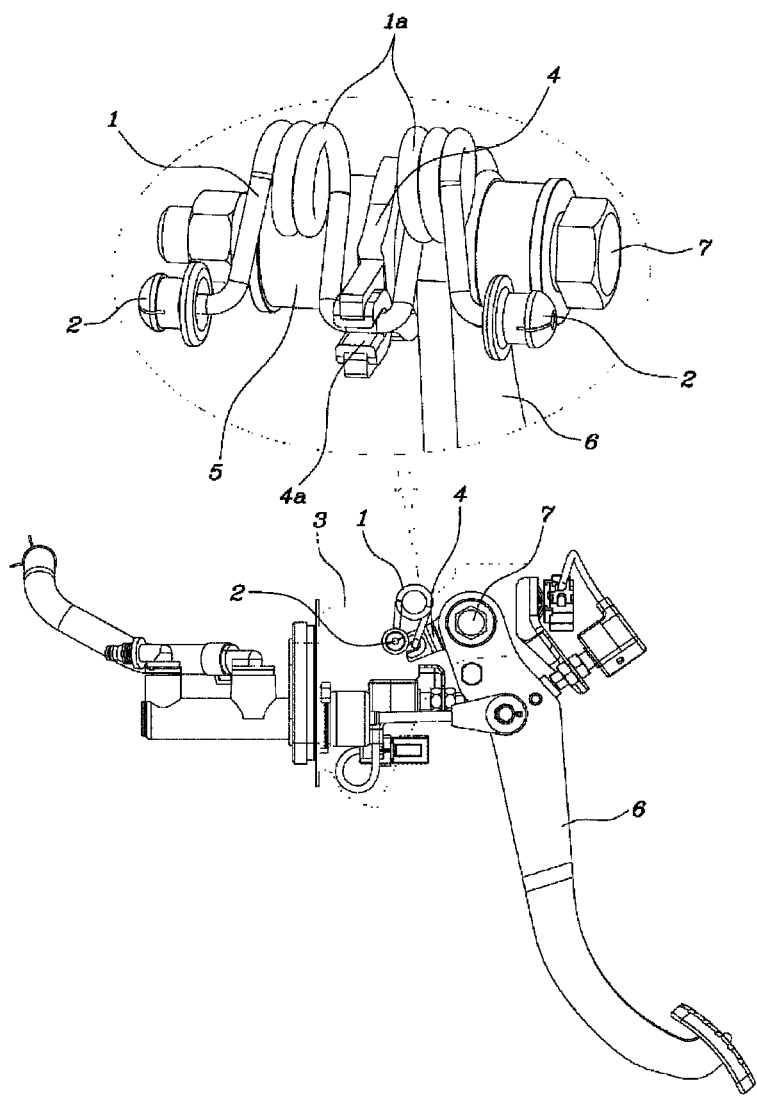
Figure 3:
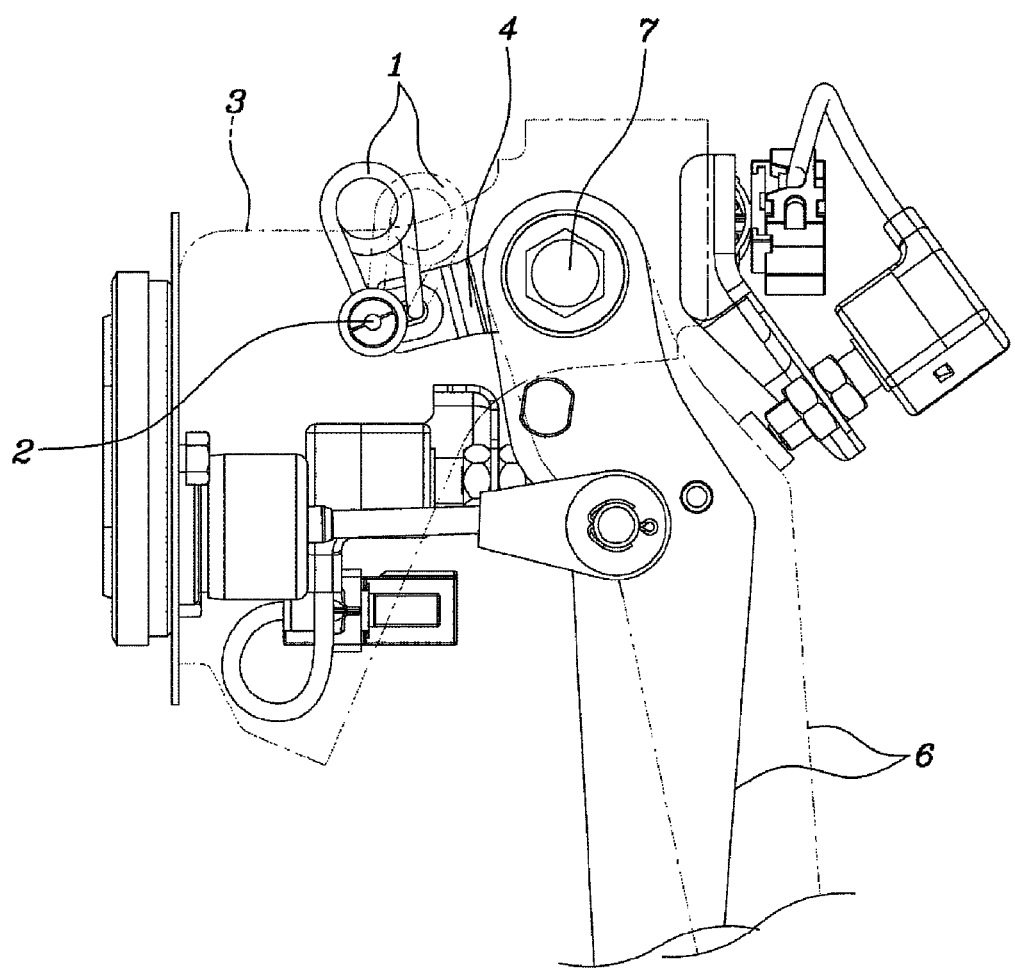
Figure 4:
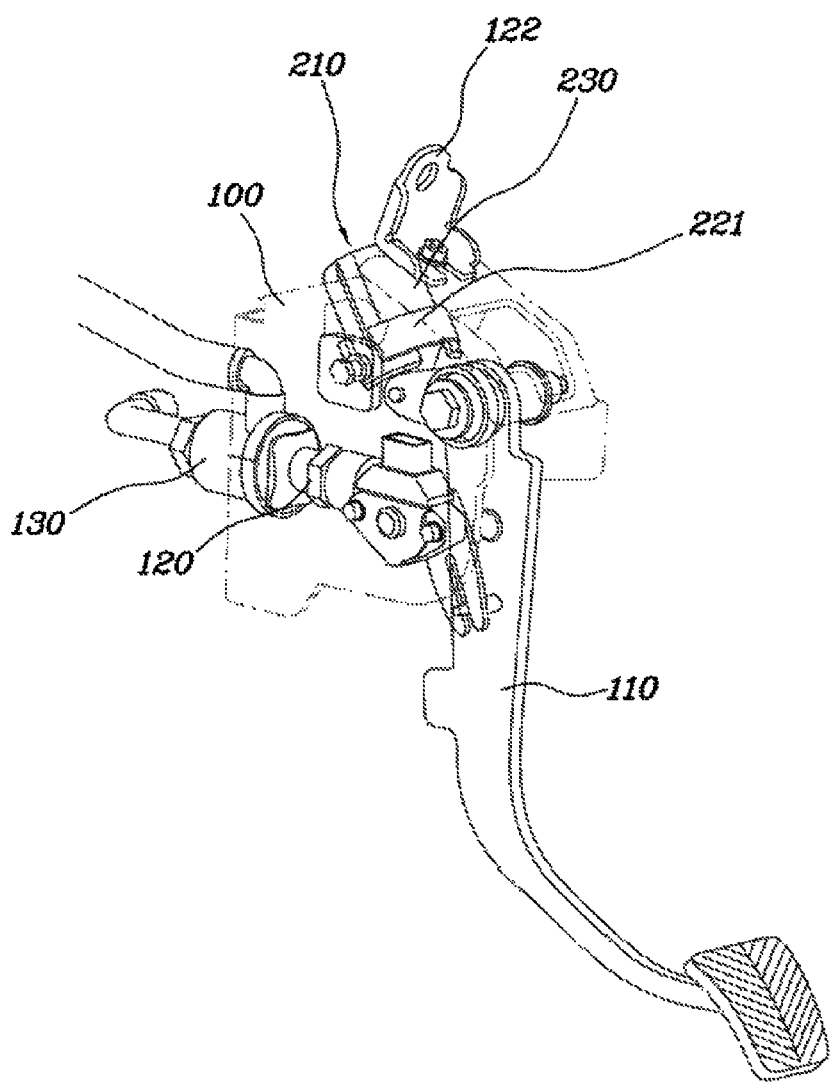
FIG. 4 and FIG. 5 are, respectively, a perspective view and a side view of an exemplary apparatus for reducing a pedal effort for a vehicle according to the present invention.
Figure 5:
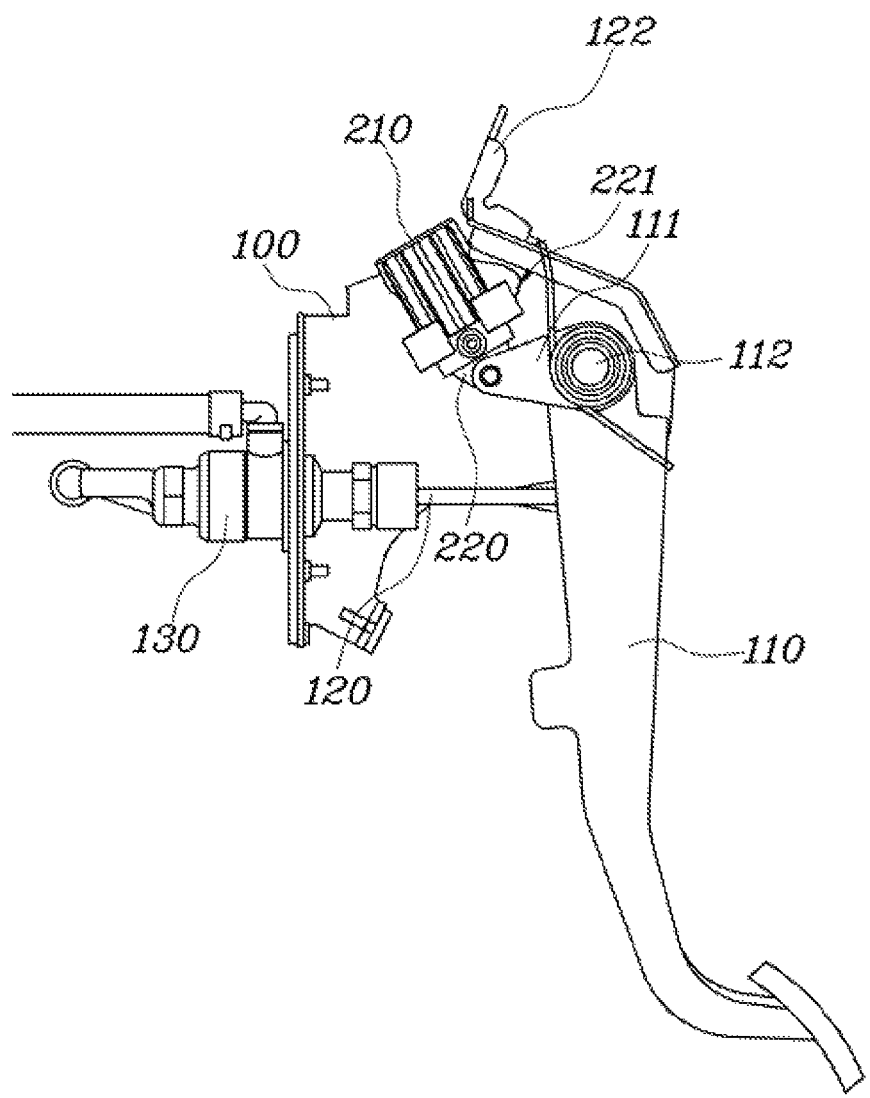

The apparatus for reducing a pedal effort for a vehicle according to various embodiments of the present invention includes a pedal member 100 fixedly installed on a vehicle body panel (dash panel) in front of a lower portion of a driver's seat, a pedal 110 having an upper end portion rotatably coupled to the pedal member 100 through a hinge shaft 112, and a master cylinder 130 generating oil pressure depending on an operation of a push rod 120 connected to the pedal 110, as shown in FIG. 4 and FIG. 5.

Meanwhile, the apparatus for reducing a pedal effort for a vehicle according to various embodiments of the present invention includes a housing 210 having one end that is opened and one end portion that is rotatably coupled to the pedal member 100, an elastic body 230 inserted into the housing 210, a slider 220 contacting the elastic body 230 and slid along a length of the housing 210, cover plates 221 coupled to the slider 220 and contacting an outer peripheral surface of the housing 210 so as to guide movement of the slider 220, and a lever protrusion 111 rotatably coupled to the pedal member 100, having an end portion rotatably coupled to the slider 220, and rotating together with the pedal 110 depending on rotation of the pedal 110 to slide the slider 220.

In various embodiments, the lever protrusion 111 may be coupled integrally with the pedal 110 or the hinge shaft 112 of the pedal 110 to rotate together with the hinge shaft 112 at the time of the rotation of the pedal 110 and the end portion of the lever protrusion 111 may also be hinge-coupled to the slider 220 to freely rotate.

Figure 6:
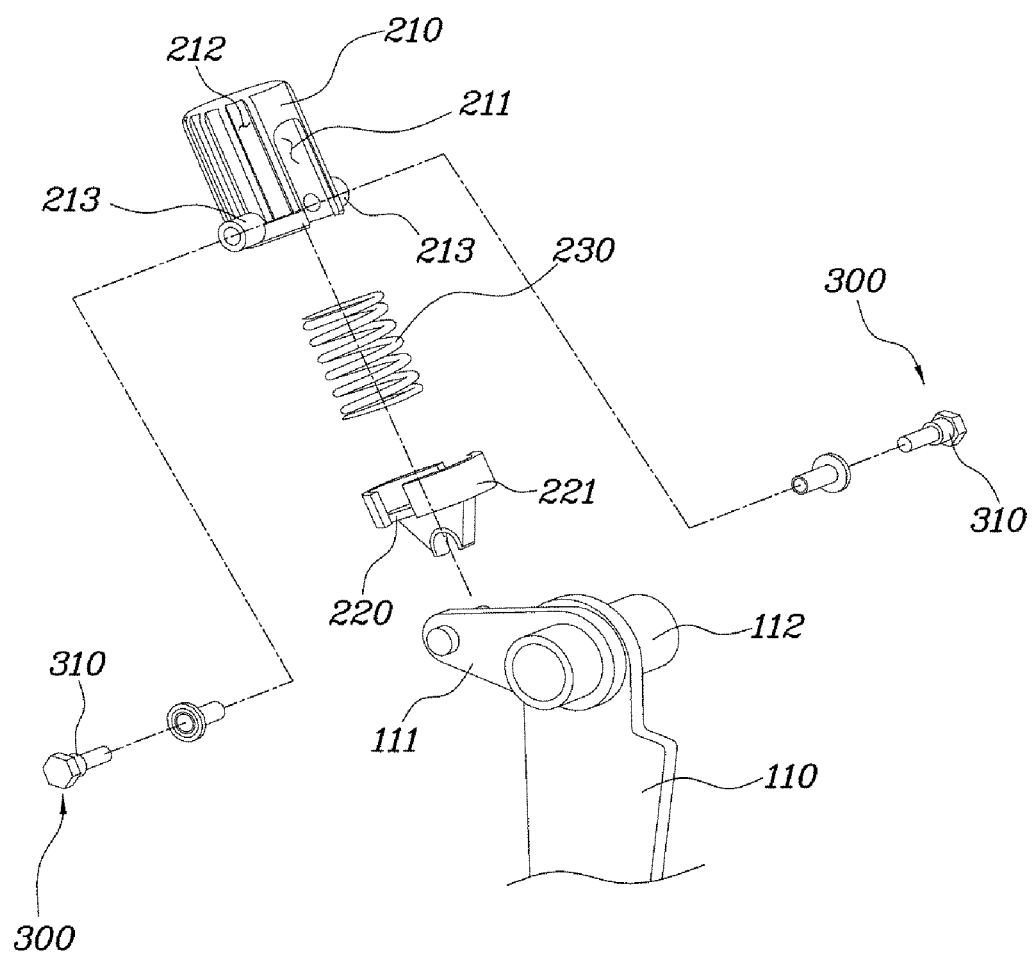
FIG. 6 and FIG. 7 are, respectively, an exploded perspective view and an assembled view of the exemplary apparatus for reducing a pedal effort for a vehicle according to the present invention.
Figure 7:
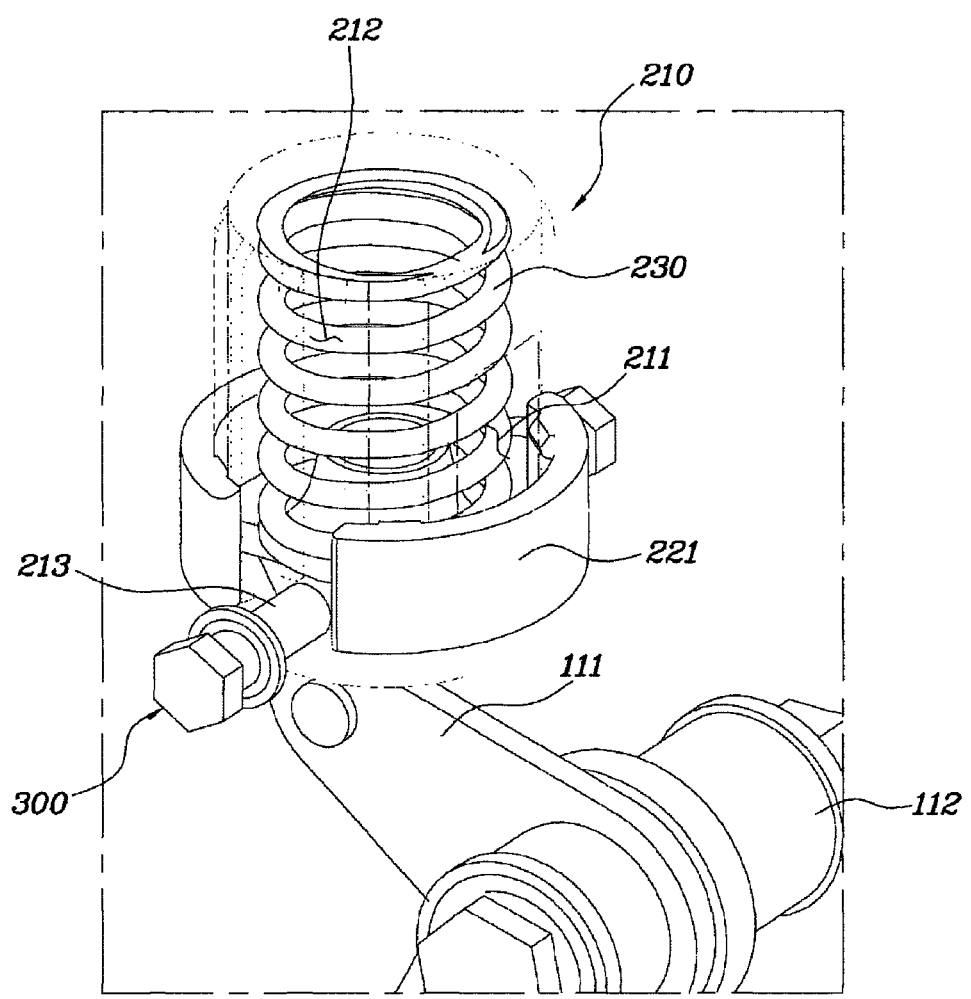

In detail, FIG. 6 and FIG. 7 are, respectively, an exploded perspective view and an assembled view of the apparatus for reducing a pedal effort for a vehicle according to various embodiments of the present invention. The housing 210 may be provided with a pair of cut openings 211 cut from one end thereof that is opened toward the other end portion thereof and facing each other, and the slider 220 contacts the elastic body 230 at an inner side of the housing 210, has both end portions penetrating through the cut openings 211, and having a pair of cover plates 221 coupled to both end portions thereof, respectively.

The slider 220 may be positioned at one end portion of the housing 210 in an initial position state of the pedal 110, and may compress the elastic body 230 while being slid toward the other end portion of the housing 210 depending on rotation of the lever protrusion 111. Here, the elastic body 230 is preferably a coil spring, but is not necessarily limited thereto, and the initial position state of the pedal 110 is preferably an initial state in which a driver does not manipulate the pedal 110, that is, a state in which any external force is not applied to the pedal 110, such that step-on of the pedal 110 is not generated, whereby the pedal 110 is pressed and positioned by elastic force of the elastic body 230 or a diaphragm spring of a clutch in a no-load state.

Figure 8:
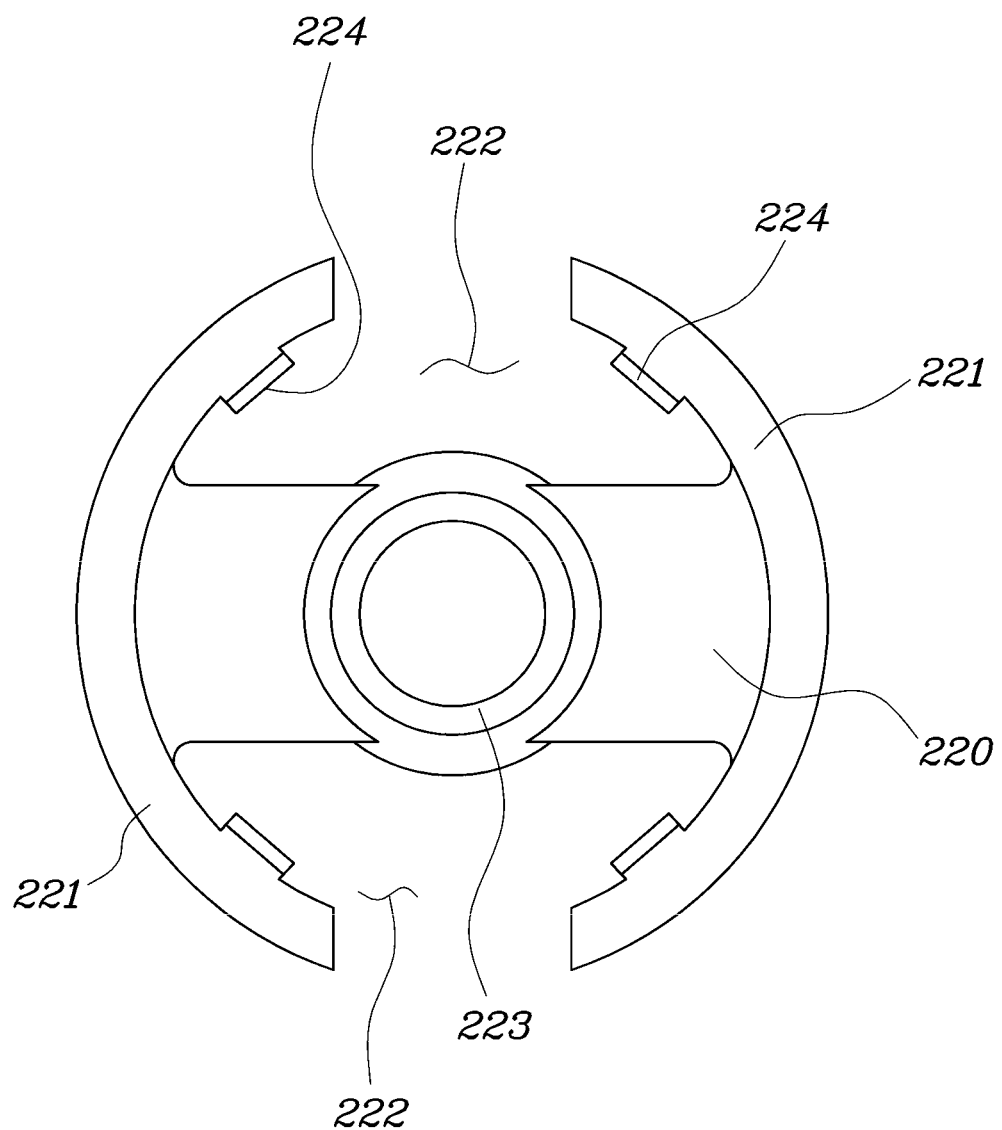
FIG. 8 is an upper side view of a slider according to the present invention.
Figure 9:
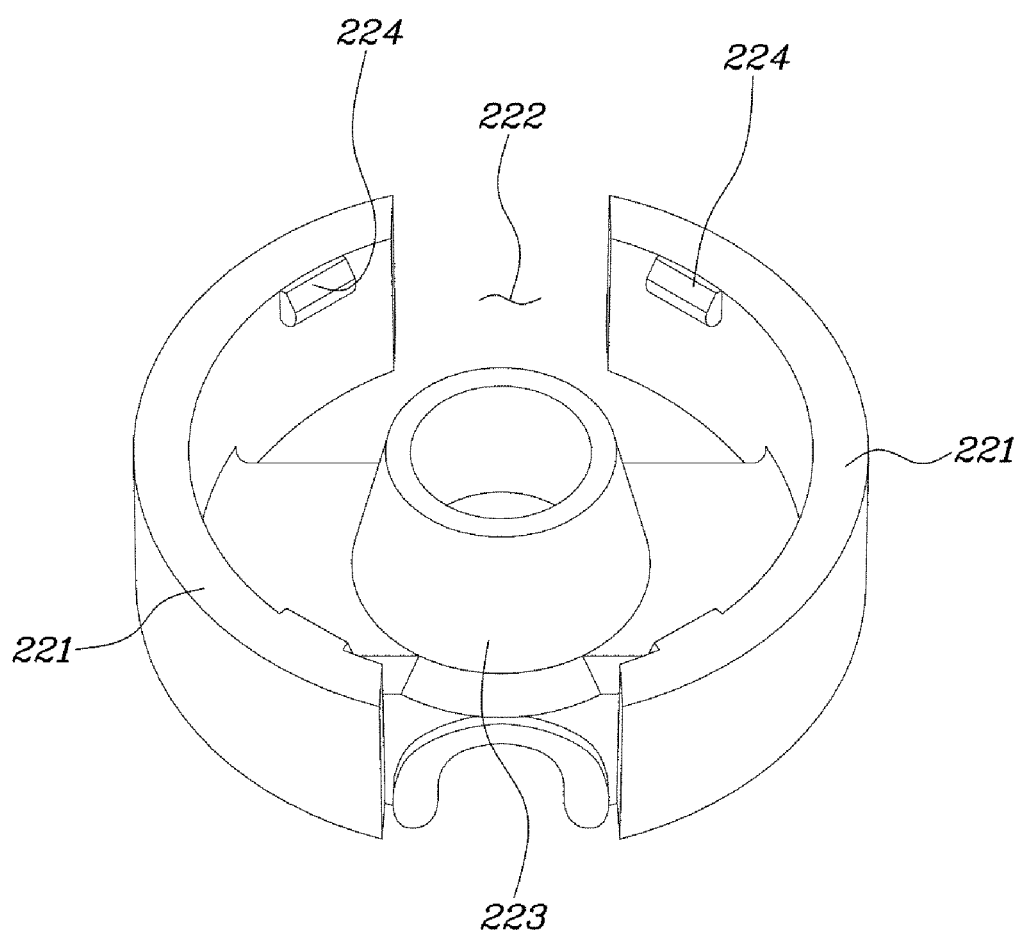
FIG. 9 is a perspective view of the slider according to the present invention.

The slider 220 may be slid along the length of the housing 210 in an internal space of the housing 210, and both end portions of the slider 220 may be slid along the cut openings 211. In addition, the cover plates 221 may have central portions coupled to both end portions of the slider 220, such that they may move along the length of the housing 210 together with the slider 220. Preferably, the cover plates 221 may be formed so as to be matched to a shape of an outer circumference of the housing 210 and be formed so as to have a predetermined width in a length direction of the housing 210 in order to surface-contact the outer peripheral surface of the housing 210, as shown in FIG. 8 and FIG. 9.

The cover plates 221 are formed so as to have the predetermined width in the length direction of the housing 210 and surface-contact the outer peripheral surface of the housing 210, thereby making it possible to stably support movement of the slider 220 in the length direction of the housing 210. A width of the cover plate 221 may be variously set depending on the intension of a designer so as to support the movement of the slider 220.

Meanwhile, according to various embodiments, the housing 210 may be formed in a cylindrical shape, and the cover plate 221 may be bent so as to form an arc along the shape of the outer circumference of the housing 210. The cover plate is formed in a circular shape, thereby making it possible to vibration, shaking, or the like, in various directions of the slider 220 at the time of the movement of the slider 220, and a load is not concentrated on any one side of the cover plate 221, but is uniformly distributed over the cover plate 221 when the cover plate supports the slider 220, thereby making it possible to allow the slider to be naturally slid.

In addition, the slider 220 may have an elastic body support protrusion 223 formed at a central portion thereof, and when the slider 220 is inserted into the housing 210, the elastic body support protrusion 223 is inserted into the elastic body 230, thereby making it possible to allow the elastic body 230 to be always put at a predetermined position on the slider 220 and allow a stable contact relationship between the slider 220 and the elastic body 230 to be maintained even at the time of the movement of the slider 220. It is preferable that the elastic body 230 contacts a corresponding position of the slider 220 between the elastic body support protrusion 223 and the cover plate 221.

Meanwhile, the pair of cover plates 221 may be formed so as to be coupled to both end portions of the slider 220, respectively, and face each other, clearances 222 may be formed between end portions of the respective cover plates 221 corresponding to each other. The clearances 222 may be formed so as to correspond to a coupled position between the housing 210 and the pedal member 100. Preferably, the housing 210 is coupled to the pedal member 100 at a position perpendicular to a circumferential direction of the cut opening 211 and the housing 210, such that the pair of cover plates 221 and a pair of clearances 222 may be formed so as to be symmetrical to each other.

Coupling between the housing 210 and the pedal member 100 will be described in more detail. As shown in FIG. 6 and FIG. 7, the apparatus for reducing a pedal effort for a vehicle according to various embodiments of the present invention may further include a fastening bolt 300 coupling the pedal member 100 and the housing 210 to each other while penetrating through the pedal member 100 and the housing 210. The fastening bolt 300 may have a screw thread 310 formed at one end portion thereof fastened to the pedal member 100 so as to be screw-coupled to the pedal member 100 and have a plane pattern formed at the other end portion thereof coupled to the housing 210 so as to be freely rotatably coupled to the housing 210.

In addition, the housing 210 may have a pair of support protrusions 213 formed at one end portion thereof, wherein the pair of support protrusions 213 may protrude outwardly from the housing 210 so as to have a predetermined length, and have opened end portions and have a hollow part formed therein so that the other end portion of the fastening bolt 300 may be inserted thereinto.

It is preferable that the support protrusions 213 have a protrusion length enough for end portions thereof to contact or be positioned to be adjacent to an inner side surface of the pedal member 100. Therefore, an area of the support protrusions 213 contacting the fastening bolt 300 is sufficiently secured, thereby making it possible to increase an area of the housing 210 supported by the fastening bolt 300. In addition, a support feature of the housing 210 is improved, and shaking of the housing 210 at the time of rotation of the housing 210 is suppressed, thereby making it possible to allow the housing 210 to stably rotate. In addition, the screw thread 310 is formed in only a portion of the fastening bolt 300, thereby making it possible to improve easiness of assembling in rotatably fixing the housing 210 to the pedal member 100.

Meanwhile, the pair of clearances 222 are formed at positions corresponding to the pair of support protrusions 213, respectively, such that the slider 220 may be slid without being caught by the support protrusions 213 at the time of being slid, and since the slider 220 may be positioned in the vicinity of points at which the support protrusions 213 are formed, a distance from the center of rotation of the housing 210 to the center of coupling between the slider 220 and the lever protrusion 111 may further become narrow.

Meanwhile, as shown in FIG. 6 and FIG. 7, a plurality of long grooves 212 may be formed along the length of the housing on the outer peripheral surface of the housing 210 and may be formed at predetermined intervals in the circumferential direction, and as shown in FIG. 8 and FIG. 9, fitting protrusions 224 inserted into the long grooves 212 to guide the movement of the slider 220 may be formed at the cover plates 221. A plurality of fitting protrusions 224 may be formed at the cover plates 221, preferably, at end portions of the cover plates 221, respectively, and the plurality of long grooves 212 may be formed so as to correspond to the fitting protrusions 224, respectively.

The fitting protrusions 224 and the long grooves 212 are formed, thereby making it possible to prevent the slider 220 from rotating in the circumferential direction of the housing 210 at the time of the movement of the slider 220, allow the slider 220 to always move in the length direction of the housing 210 along a predetermined path, and increase close adhesion between the cover plate 221 and the housing 210 to enable stable movement of the slider 220.

Figure 10:
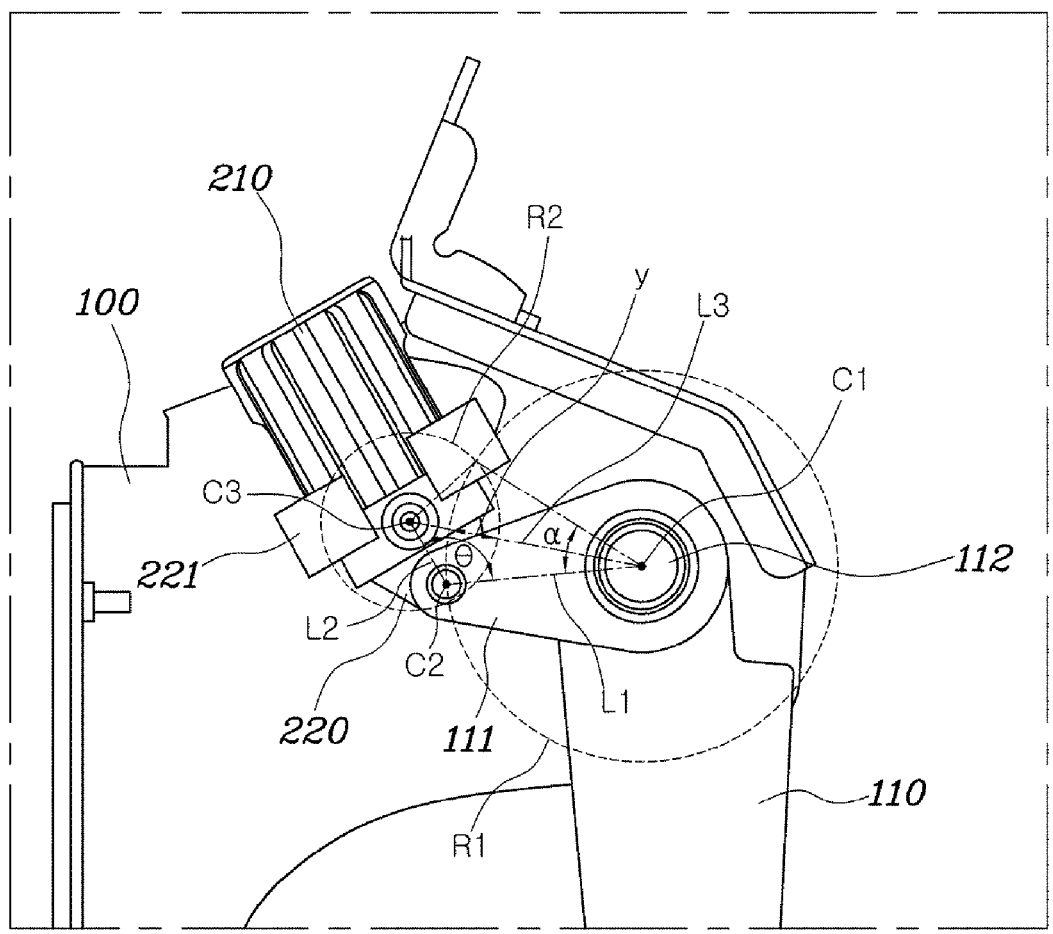
FIG. 10 is a view showing an angle setting state in an initial position state of a pedal according to the present invention.

Meanwhile, FIG. 10 is a view showing an angle setting state in an initial position state of a pedal according to various embodiments of the present invention. When it is assumed that the center of rotation of the lever protrusion 111 is C1, the center of coupling between the lever protrusion 111 and the slider 220 is C2, the center of rotation of the housing 210 is C3, a distance from C1 to C2 is L1, and a distance from C2 to C3 is L2, the housing 210 may be rotatably coupled to the pedal member 100 so as to have an overlapped section y between a first arc R1 of which the center is C1 and a radius is L1 and a second arc R2 of which the center is C3 and a radius is L2.

Here, C1 may be a shaft center of the hinge shaft 112 at which the lever protrusion 111 and the pedal 110 are coupled to each other, C2 may be a hinge-coupling shaft center between the lever protrusion 111 and the slider 220, and C3 may be a bolt-coupling shaft center between the housing 210 and the pedal member 100.

As shown in FIG. 10, the housing 210 has one end portion rotatably coupled to the pedal member 100, and the slider 220 is assembled to one end portion of the housing 210 in the initial position state of the pedal, thereby making it possible increase the overlapped section y between the first arc R1 and the second arc R2. In other words, since L2 is configured so as to be smaller than L1 depending on a coupling position of the housing 210, C3 may be positioned so as to be adjacent to the first arc R1. Therefore, the overlapped section y between the first arc R1 and the second arc R2 may be increased so as to be larger as compared with the case in which C3 is formed at the other end portion of the housing 210.

Here, when it is assumed that a virtual line connecting C1 and C3 to each other is L3, the overlapped section y may be a portion corresponding to L3 in a space formed by overlapping the first arc R1 and the second arc R2 with each other, and as the overlapped section y is increased, a maximum compression amount of the elastic body 230 depending on the rotation of the pedal 110, that is, a maximum displacement of the elastic body 230 is increased, thereby making it possible to increase a magnitude of auxiliary power applied to the pedal 110 at the time of restoration of the elastic body 230.

In addition, since the displacement of the elastic body 230 may be increased, even though a spring having a low spring constant is used as the elastic body 230, the auxiliary force may be sufficiently increased. Further, the spring having the low spring constant is used, such that an initial effort may be reduced, thereby making it possible to reduce fatigue of the driver. In addition, the spring constant may be reduced, such that the elastic body 230 may be easily compressed at the time of assembling the elastic body 230 and the slider 220 to each other, thereby making it possible to improve an entire assembling feature.

Meanwhile, the housing 210 may be coupled to the pedal member 100 so that L3 is positioned in a rotation angle range α of the lever protrusion 111 and a length of L1 is two times or more the length of L2. More preferably, a length of L1 may have any one multiple number value among values of 2.1 times or more to 3.5 times or less the length of L2 in the initial position state of the pedal. In the case in which a length of L1 has a multiple number value less than 2.1 times the length of L2, for example, in the case in which a length of L1 has a multiple number value of 1.5 times or 1.8 times the length of L2, load switching may not be performed within the rotation angle range α of the level protrusion 111.

Figure 11:
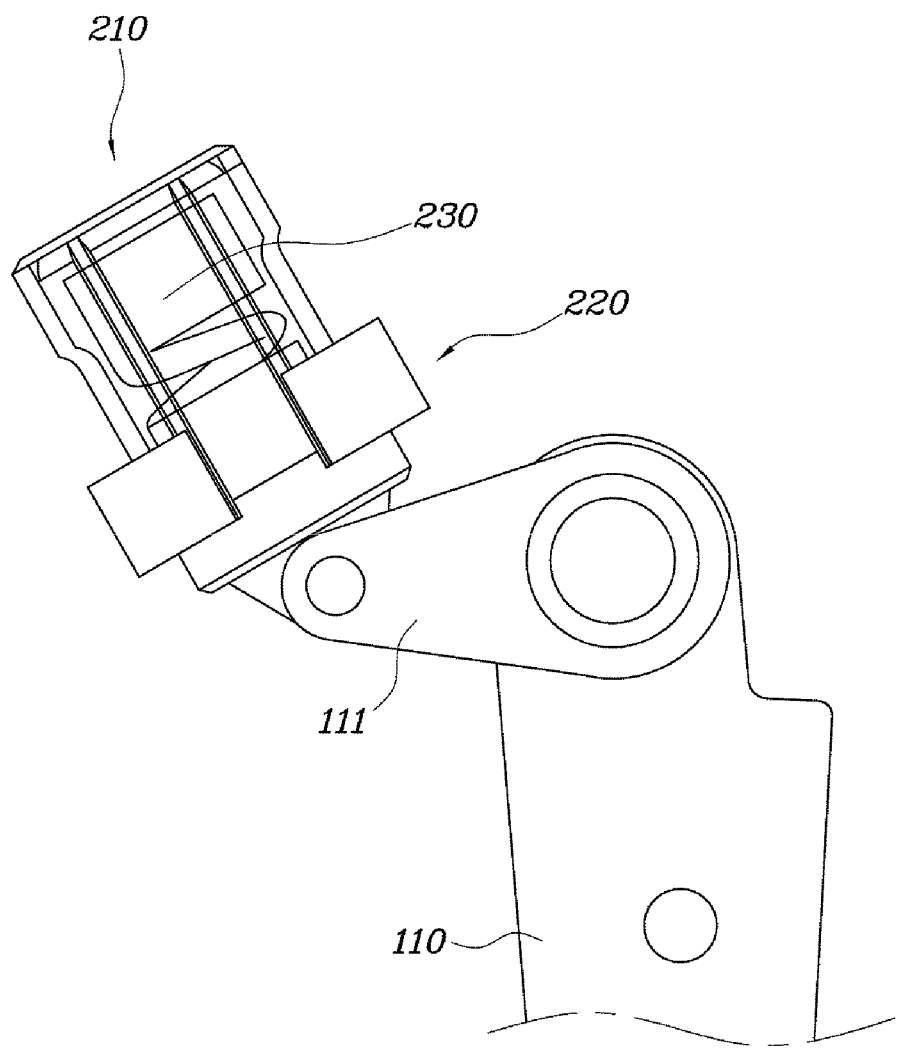
FIG. 11, FIG. 12 and FIG. 13 are views showing an operation sequence of the exemplary apparatus for reducing a pedal effort for a vehicle depending on rotation of the pedal.
Figure 12:
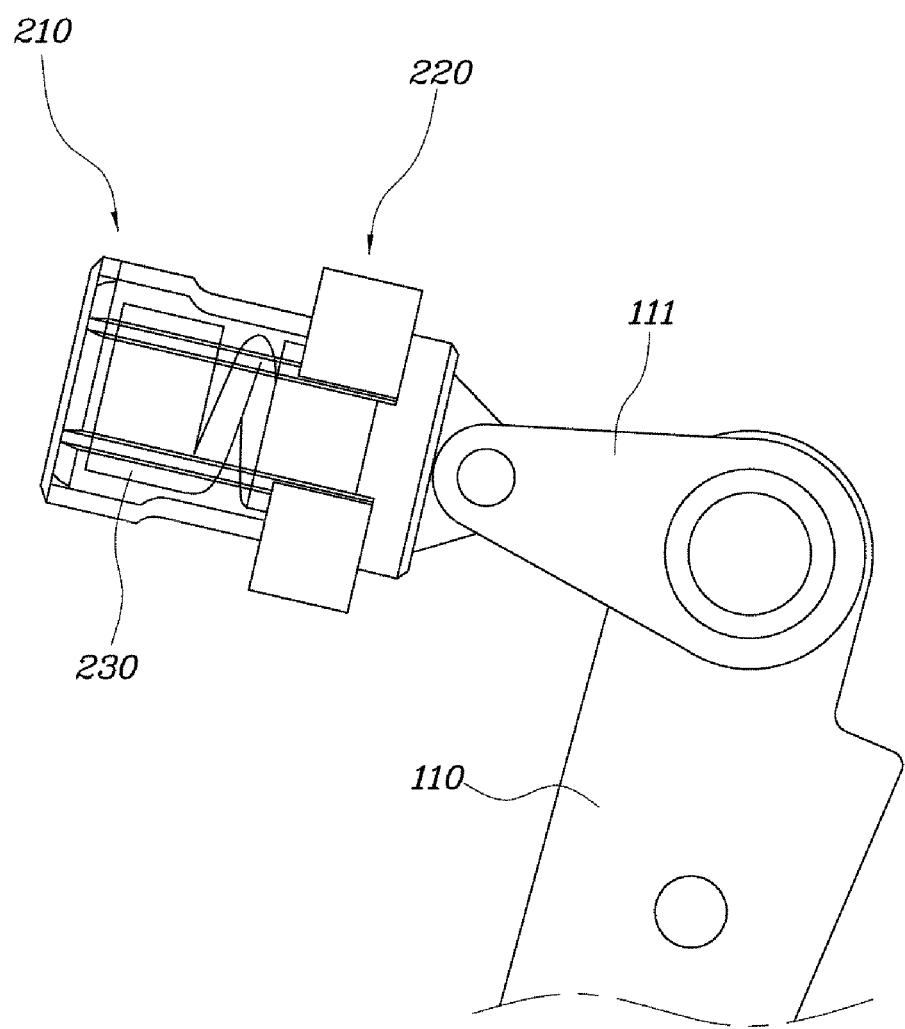
Figure 13:
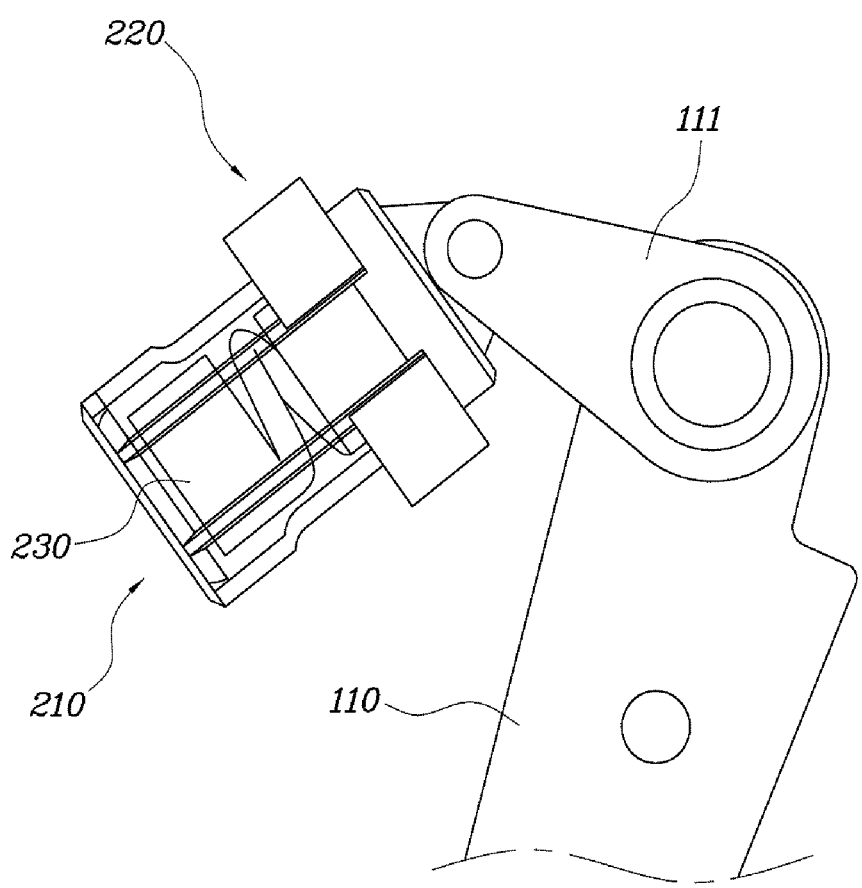

In this case, switching may be generated in a load applied to the pedal based on a point at which an angle Θ formed by L1 and L2 depending on the rotation of the lever protrusion 111 is 180 degrees, that is, a point at which the angle Θ is in parallel with L3. That is, as shown in FIG. 11, when the step-on starts by the driver in the initial position state of the pedal 110, such that the lever protrusion 111 rotates, the elastic body 230 is compressed to apply reaction force to the rotation of the lever protrusion 111 before the angle Θ formed by L1 and L2 depending on the rotation of the lever protrusion 111 passes through 180 degrees as shown in FIG. 12. Then, in the case in which the angle Θ formed by L1 and L2 passes through 180 degrees as shown in FIG. 13, that is, in the case in which the angle passes through L3, which is a switching virtual line, the elastic body 230 is restored, such that load switching may be performed so as to add the auxiliary power to the rotation of the lever protrusion 111. Then, when the driver takes his/her foot off the pedal 110, the pedal 110 again returns to the initial position state by restoring force of a diaphragm spring installed in a clutch disk.

Meanwhile, in the case in which a length of L1 has a multiple number value less than 2.1 times the length of L2, L1 is out of or is substantially positioned adjacently to the rotation angle range α of the lever protrusion 111 in the initial position of the pedal, such that a situation in which it is not recognized that the switching occurs in the case in which the driver substantially steps on the pedal may occur. On the other hand, in the case in which a length of L1 is set to have a multiple number value exceeding 3.5 times the length of L2, the length of L2 becomes further short to increase the overlapped section y between the first arc R1 and the second arc R2, thereby making it possible to further increase a compression amount of the elastic body 230. However, a rotation amount of the housing 210 is increased depending on the rotation of the lever protrusion 111 and lengths of the elastic body 230 and the housing 210 are also increased depending on an increase in the displacement of the elastic member 230, such that the housing 210 may collide with the pedal member 100, the push rod, or the like.

Therefore, the load switching is generated during the step-on of the pedal 110, and it is preferable that a length ratio between L1 and L2 is set in consideration of a layout with the surrounding structures. More preferably, a length of L1 may be set to have a multiple value of 2.1 times or more to 3.5 times or less the length of L2.

It is preferable that in the length ratio between L1 and L2 is set by adjusting a coupled position between the housing 210 and the pedal member 100 to adjust L2 rather than adjusting L1. However, the present invention is not necessarily limited thereto. That is, the length ratio may also be set by adjusting a length of the lever protrusion 111. Here, various exemplary embodiments may be applied.

Meanwhile, it is preferable that the angle Θ formed by L1 and L2 is 90 degrees or more. More preferably, the housing 210 may be coupled to the pedal member 100 so that the angle Θ formed by L1 and L2 is any one among angles in a range of 100 degrees to 180 degrees.

In the case in which the angle Θ formed by L1 and L2 is less than 100 degrees, the housing 210 collides with the pedal member 100 or structures and devices installed in the pedal member 100 in the initial position state of the pedal, such that interference may be generated, and in the case in which the angle Θ formed by L1 and L2 is 180 degrees or more, the load switching may not be generated. Therefore, it is preferable that the angle Θ formed by L1 and L2 is set to an initial angle between 100 to 180 degrees in consideration of the interference with the pedal member 100 and the load switching.

The length ratio and the angle between L1 and L2 described above preferably have values in the ranges as described above, but are not necessarily limited thereto. That is, each range may be widened or narrowed depending on a layout and an installation relationship between the pedal member 100, the housing 210, the slider 220, the elastic body 230, the lever protrusion 111, and the like, in order to accomplish a set object.

Figure 14:
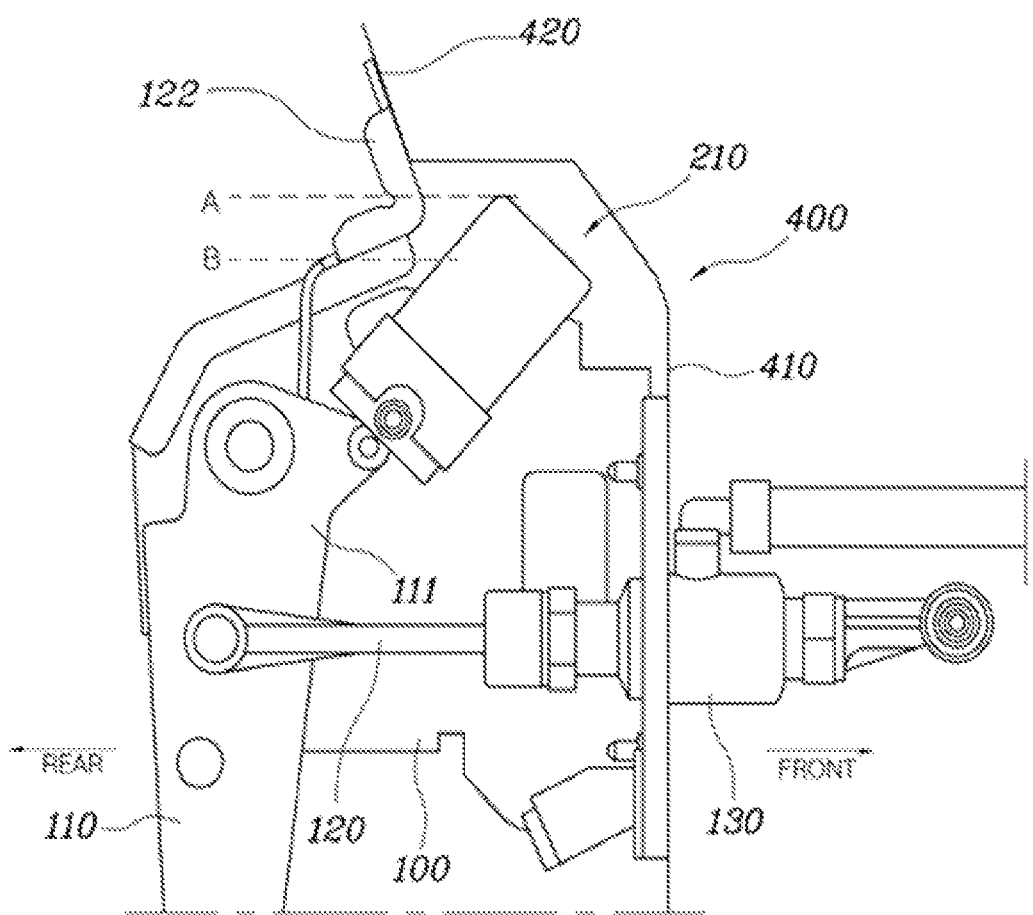
FIG. 14 and FIG. 15 are views showing an operation form of the exemplary apparatus for reducing a pedal effort for a vehicle according to the present invention at a time of collision of the vehicle.
Figure 15:
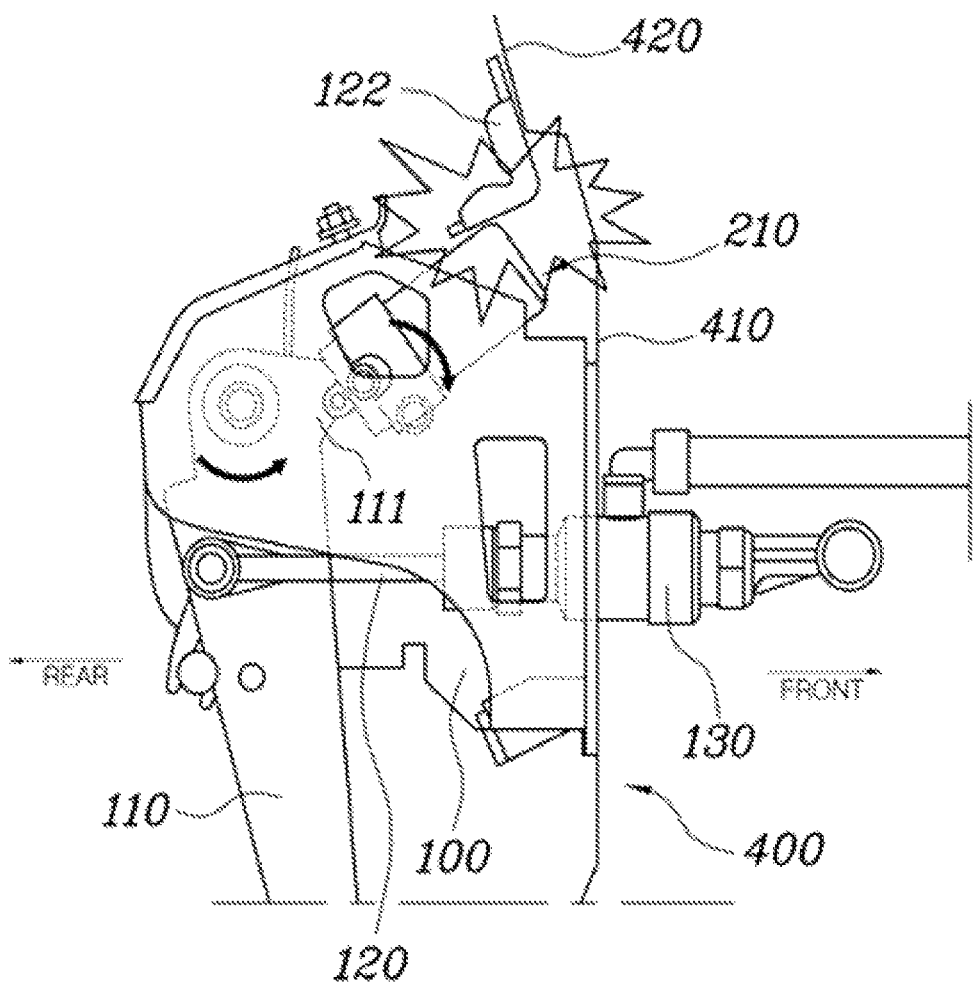

Meanwhile, FIG. 14 and FIG. 15 are views showing an operation form of the apparatus for reducing a pedal effort for a vehicle according to various embodiments of the present invention at the time of collision of the vehicle, wherein FIG. 14 shows a form before collision of the vehicle and FIG. 15 shows a form after collision of the vehicle.

As shown in FIG. 14 and FIG. 15, the apparatus for reducing a pedal effort for a vehicle according to various embodiments of the present invention further includes a fixing bracket 122 coupling the pedal member 100 and a vehicle body 400 to each other. The fixing bracket 122 may be provided with a separation groove 121 opened toward the rear of the vehicle as shown in FIG. 4, and the pedal member 100 may be coupled to the separation groove 121 through various fastening means such as bolting, riveting, and the like.

In detail, it is preferable that the pedal 110 is hinge-coupled to the pedal member 100 so as to rotate in front and rear directions of the vehicle at the time of being stepped on, and it is preferable that the fixing bracket 122 is coupled to an upper end of the pedal member 100 to allow the upper end of the pedal member 100 to be fixed to a cowl 420 connected to a dash panel 410 in the vehicle body 400.

Conventionally, in the case in which impact seriously injuring a passenger is generated, the dash panel 410 partitioning an engine room and the interior of the vehicle from each other is depressed toward the interior to move the pedal member 100 toward the interior of the vehicle. Therefore, a problem that the pedal 110 moves toward the passenger together with the movement of the pedal member 100 due to instantaneous impact, such that an ankle of the passenger is twisted.

In order to solve this problem, the separation groove 121 opened toward the rear of the vehicle is formed in the fixing bracket 122 as shown in FIG. 4, such that only the pedal member 100 may be separated from the fixing bracket 122 to move toward the interior of the vehicle, that is, the rear of the vehicle while maintaining the fixing bracket 122 as it is at the time of depression of the dash panel 410 depending on the collision, and the uppermost end A of the housing 210 is positioned at a position higher than that of the lowermost end B of the fixing bracket 122 in the initial position state of the pedal 110, such that the housing 210 may collide with the fixing bracket 122 to thereby rotate when the pedal member 100 moves toward the interior of the vehicle, as shown in FIG. 15.

Here, the other end portion of the housing 210 may rotate toward the front of the vehicle, and the pedal 110 rotates toward the front of the vehicle like at the time of being stepped on by the rotation of the housing 210 and elastic force of the elastic body 230, such that the pedal 110 moves toward the front of the vehicle even though the pedal member 100 protrudes and moves toward the interior of the vehicle, thereby making it possible to prevent the ankle of the passenger from being injured.

According to the apparatus for reducing a pedal effort for a vehicle having the structure as described above, an effort of a clutch pedal may be reduced, an assembling property may be improved, and an initial effort may be reduced.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for reducing a pedal effort for a vehicle, comprising:
    a housing having a first end that is opened and a second end that is rotatably coupled to a pedal member;
    an elastic body inserted within the housing;
    a slider contacting the elastic body and sliding along a length of the housing;

a pair of cover plates coupled to the slider and contacting an outer peripheral surface of the housing so as to guide movement of the slider;

a lever protrusion rotatably coupled to the pedal member, having an end portion rotatably coupled to the slider, and rotatable together with a pedal depending on rotation of the pedal, to slide the slider; and a fastening bolt coupling the pedal member and the housing to each other while penetrating through the pedal member and the housing;

wherein clearances are formed between end portions of the pair of cover plates corresponding to each other, and are formed so as to correspond to a coupled position between the housing and the pedal member, and wherein the cover plates are slid on the outer peripheral surface along the length of the housing without the interference with the fastening bolt via the clearances.

2. The apparatus for reducing the pedal effort for the vehicle of claim 1, wherein the housing is provided with a pair of cut openings cut from the first end thereof that is opened toward the second end thereof and facing each other.

3. The apparatus for reducing the pedal effort for the vehicle of claim 2, wherein the slider contacts the elastic body at an inner side of the housing, has first and second end portions penetrating through the cut openings, and has the pair of cover plates coupled to both end portions thereof, respectively.

4. The apparatus for reducing the pedal effort for the vehicle of claim 1, wherein a plurality of long grooves are formed along the length of the housing on the outer peripheral surface of the housing and are formed at predetermined intervals in a circumferential direction, and a plurality of fitting protrusions inserted into the long grooves to guide the movement of the slider are formed at the cover plates.

5. The apparatus for reducing the pedal effort for the vehicle of claim 4, wherein the plurality of fitting protrusions are formed at end portions of the cover plates, respectively, and the plurality of long grooves are formed so as to correspond to the fitting protrusions, respectively.

6. The apparatus for reducing the pedal effort for the vehicle of claim 1, wherein the cover plates are formed so as to be matched to a shape of an outer circumference of the housing and are formed so as to have a predetermined width in a length direction of the housing in order to surface-contact the outer peripheral surface of the housing.

7. The apparatus for reducing the pedal effort for the vehicle of claim 1, wherein the housing is formed in a cylindrical shape, and the cover plate is bent so as to form an arc along a shape of an outer circumference of the housing.

8. The apparatus for reducing the pedal effort for the vehicle of claim 1, wherein the fastening bolt has a screw thread formed at a first end portion thereof fastened to the pedal member so as to be screw-coupled to the pedal member, and having a plane pattern formed at a second end portion thereof coupled to the housing so as to be freely rotatably coupled to the housing.

9. The apparatus for reducing the pedal effort for the vehicle of claim 8, wherein the housing includes support protrusions formed at one end portion thereof, the support protrusions protruding outwardly from the housing so as to have a predetermined length, having a hollow part formed therein so that the second end portion of the fastening bolt is inserted thereinto.

10. The apparatus for reducing the pedal effort for the vehicle of claim 1, further comprising a fixing bracket coupling the pedal member and a vehicle body to each other, wherein the fixing bracket is provided with a separation groove opened toward a rear of the vehicle, and the pedal member is coupled to the separation groove.

11. The apparatus for reducing the pedal effort for the vehicle of claim 10, wherein an uppermost end of the housing is positioned at a position higher than that of a lowermost end of the fixing bracket in an initial position state of the pedal, and when impact is generated in the vehicle, such that the pedal member moves toward the rear of the vehicle, the pedal member is separated from the fixing bracket along the separation groove, and the fixing bracket collides with the housing to rotate the housing.

12. The apparatus for reducing the pedal effort for the vehicle of claim 11, wherein the pedal is hinge-coupled to the pedal member so as to rotate in front and rear directions of the vehicle, and the housing is configured to apply elastic force to the lever protrusion so that the pedal rotates toward the front of the vehicle in the initial position state of the pedal at a time of the rotation depending on the collision with the fixing bracket.

13. The apparatus for reducing the pedal effort for the vehicle of claim 1, wherein in a case in which the pedal is compressed and rotated in an initial position state of the pedal, such that a coupling center between the slider and the lever protrusion passes through a switching virtual line connecting a center of rotation of the housing and a center of rotation of the lever protrusion to each other, the elastic body is compressed and is then restored at a point in time in which the coupling center passes through the switching virtual line, thereby applying auxiliary force to the rotation of the lever protrusion.

* * * * *